(12) United States Patent
Sinha

(10) Patent No.: US 12,095,671 B2
(45) Date of Patent: Sep. 17, 2024

(54) APPARATUS AND METHOD FOR NETWORK FUNCTION SIGNALING LATENCY REDUCTION

(71) Applicant: Charter Communications Operating, LLC, St. Louis, MO (US)

(72) Inventor: Ashutosh Kumar Sinha, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/895,356

(22) Filed: Aug. 25, 2022

(65) Prior Publication Data

US 2024/0073150 A1 Feb. 29, 2024

(51) Int. Cl.
*H04L 47/283* (2022.01)
*H04L 41/40* (2022.01)
*H04L 43/0864* (2022.01)

(52) U.S. Cl.
CPC .......... *H04L 47/283* (2013.01); *H04L 41/40* (2022.05); *H04L 43/0864* (2013.01)

(58) Field of Classification Search
CPC .... H04L 47/283; H04L 41/40; H04L 43/0864
USPC ....................................................... 709/224
See application file for complete search history.

(56) References Cited

U.S. PATENT DOCUMENTS

| | | | | |
|---|---|---|---|---|
| 11,330,027 B1* | 5/2022 | Khandekar | ......... | H04L 43/0876 |
| 2006/0129528 A1* | 6/2006 | Miyamoto | .......... | G06F 16/2471 |
| 2007/0008974 A1* | 1/2007 | Dispensa | ............ | H04L 12/5692 |
| | | | | 370/392 |
| 2010/0228824 A1* | 9/2010 | Lin | ..................... | H04L 43/0864 |
| | | | | 709/204 |
| 2013/0272253 A1* | 10/2013 | Veenstra | ............... | H04W 72/52 |
| | | | | 370/329 |
| 2019/0260828 A1* | 8/2019 | Akao | ..................... | G06F 9/5083 |
| 2020/0127916 A1* | 4/2020 | Krishan | ................ | H04L 47/125 |
| 2020/0177632 A1* | 6/2020 | Han | ........................ | H04L 61/00 |
| 2020/0267214 A1* | 8/2020 | Yang | ................... | H04L 67/1008 |

(Continued)

OTHER PUBLICATIONS

3GPP "Network Function Repository Services" Third Generation Partnership Technical Specification Group Core NetWork and Terminals, 5G System, TS 29.510, version 17.4.0, Release 17, (2021).

*Primary Examiner* — Nicholas R Taylor
*Assistant Examiner* — Chong G Kim
(74) *Attorney, Agent, or Firm* — Young Basile Hanlon & MacFarlane, P.C.

(57) ABSTRACT

Disclosed herein are apparatus and methods for reducing latency in core network processing in the telecommunications networks. A method includes receiving, by a network function (NF) at registration time with a network function repository function (NRF), resource metrics and a network address for each NF registered with the NRF, invoking, by the NF, one or more network addresses to request updated resource metrics from an associated NF, starting, by the NF, a response timer for each invoked network address, stopping, by the NF, the response timer for each invoked network address upon receipt of an updated resource metrics from the associated NF, determining, by the NF, a round-trip time for each associated NF having a start time and a stop time, and determining, by the NF, a ranking for each NF based on at least one of the round-trip time and the updated resource metrics.

18 Claims, 6 Drawing Sheets

(56) References Cited

U.S. PATENT DOCUMENTS

| | | | |
|---|---|---|---|
| 2020/0313996 A1* | 10/2020 | Krishan | H04L 41/5096 |
| 2020/0344273 A1* | 10/2020 | Sinha | H04L 65/1045 |
| 2022/0038545 A1* | 2/2022 | Krishan | H04L 67/1014 |
| 2022/0070648 A1* | 3/2022 | Krishan | H04W 8/005 |
| 2022/0131945 A1* | 4/2022 | Sapra | H04L 47/12 |
| 2022/0232066 A1* | 7/2022 | Subramaniam | H04L 41/046 |
| 2022/0236978 A1* | 7/2022 | Yu | G06F 8/60 |
| 2022/0345913 A1* | 10/2022 | Al-Dulaimi | H04W 24/04 |
| 2022/0405127 A1* | 12/2022 | Huo | G06F 9/5027 |
| 2022/0417783 A1* | 12/2022 | Srivastava | H04L 47/826 |
| 2023/0269608 A1* | 8/2023 | Puente Pestaña | H04W 24/10 370/252 |

\* cited by examiner

APPARATUS AND METHOD FOR NETWORK FUNCTION SIGNALING LATENCY REDUCTION

TECHNICAL FIELD

This disclosure relates to telecommunications networks. More specifically, this disclosure relates to reducing latency in core network processing in the telecommunications networks.

BACKGROUND

The 5$^{th}$ generation mobile network is 5G system (5GS), which includes a 5G access network (5G-AN), a 5G core network (5GC), and user equipment (UE). The 5GC architecture is a service-based architecture, which implements a cloud-based design approach. The 5GC employs network functions (NF). A NF can offer one or more services to other NFs via Application Programming Interfaces (API). Each NF is implemented with or uses microservices and containers in a distributed architecture. Upon instantiation in the 5GC, a NF registers with a NF repository function (NRF). The NRF provides the NF with a list of other registered NFs along with load factor, priority, and other metrics regarding each registered NF. The NFs use this information to select a NF for required services. However, this NRF provided information can be stale and out-of-date with respect to when a NF might need the services. Moreover, this selection procedure does not consider the communication path latency. The communication path latency can differ greatly due to the distributive nature of the architecture. For example, the listed NFs can be spread out geographically, which can cause delays. This can lead to increased latency issues, poor performance, and an unsatisfactory customer experience. This can be detrimental for ultra-reliable low-latency communications (URLLC) applications, such as for example, medical applications, autonomous vehicle applications, and the like.

SUMMARY

Disclosed herein are apparatus and methods for reducing latency in core network processing in the telecommunications networks.

In some implementations, a method includes receiving, by a network function (NF) at registration time with a network function repository function (NRF), resource metrics and a network address for each NF registered with the NRF, invoking, by the NF, one or more network addresses to request updated resource metrics from an associated NF, starting, by the NF, a response timer for each invoked network address, stopping, by the NF, the response timer for each invoked network address upon receipt of an updated resource metrics from the associated NF, determining, by the NF, a round-trip time for each associated NF having a start time and a stop time, and determining, by the NF, a ranking for each NF based on at least one of the round-trip time and the updated resource metrics.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
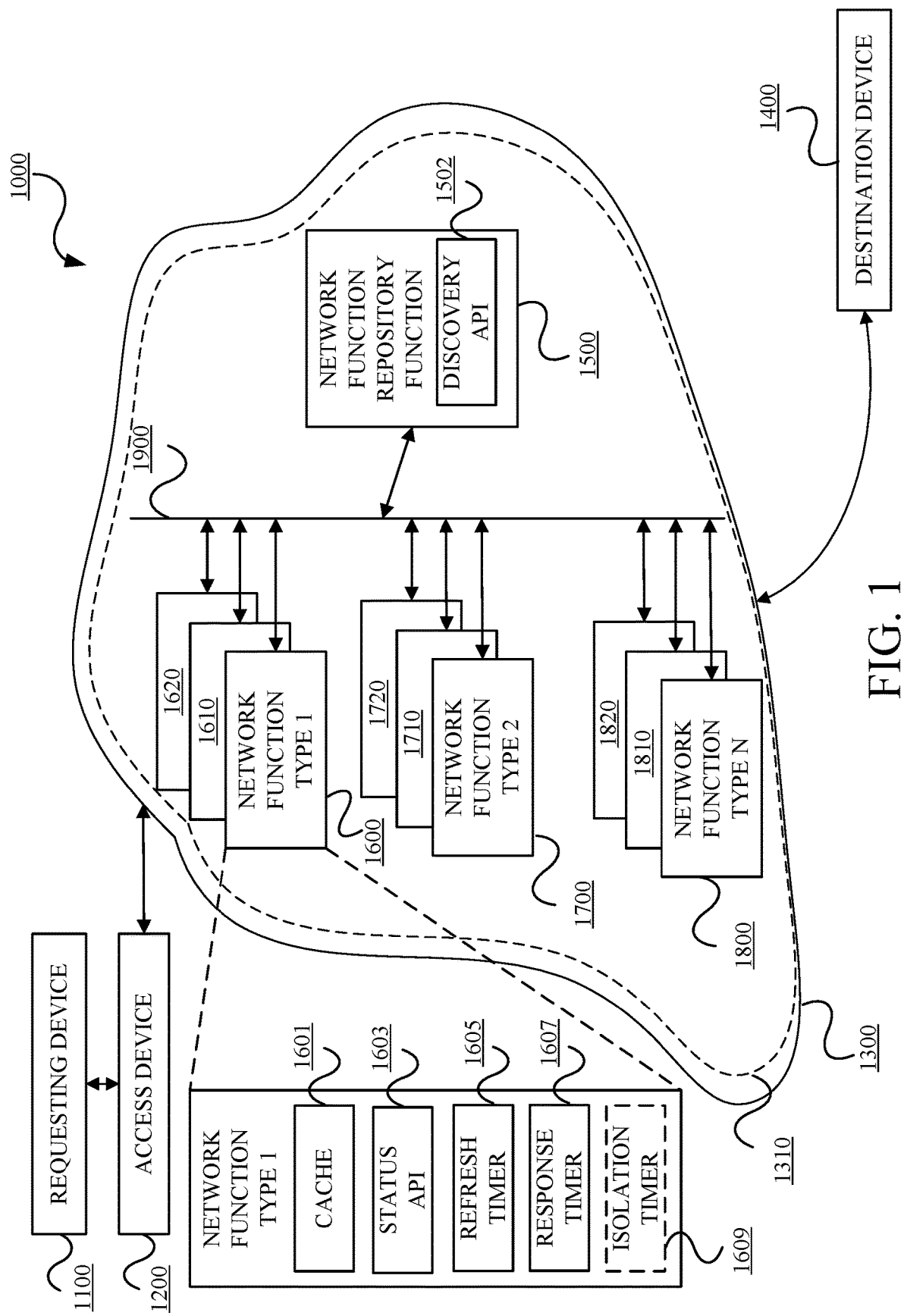
FIG. 1 is a diagram of an example system and/or architecture of a telecommunications network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system or platform" includes any unit, or combination of units, capable of performing any method, or any portion or portions thereof, disclosed herein. For example, the "server", "computer", "computing device or platform", "cloud computing system or platform", or "distributive computing or platform" may include at least one or more processor(s) and/or memory, as applicable and appropriate.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices, and systems for reducing latency in core network processing in the telecommunications networks. In some implementations, the systems and methods described herein reduce latency in control plane communications in telecommunications networks, such as for example, a 5G telecommunications networks and in particular, 5G network functions (5G NF). A mechanism is provided by which a NF can compute round-trip time (RTT) paths for registered NFs which can provide required services. The RTTs can be ranked and a NF with a highest ranked RTT path can be selected to provide the required services.

In some implementations, upon registration by a NF, a NF repository function (NRF) can provide network addresses of each registered NF. For example, uniform resource locators (URLs) can be provided for each registered NF. Each NF can be provided with a status API or similar functionality responsive to invocation of the URL. That is, the network address can be associated with the status API on the NF. The NF can then invoke the URL to request or obtain updated load, priority, CPU utilization, memory utilization, and/or other resource utilization and performance metrics (collectively "resource metrics") directly from the NF. In some implementations, the invocation can be based on a periodic or refresh timer, on-demand, and/or combinations thereof. The NF can start a response timer upon invocation to determine a RTT path upon receiving a response from the invoked NF.

In some implementations, an isolation timer can be used for NFs which are non-responsive or respond negatively to the request. The NF can then retry upon expiration of the isolation timer.

FIG. 1 is a diagram of an example system and architecture 1000 with a telecommunications network 1300 in accordance with embodiments of this disclosure. In an implementation, the architecture 1000 may include a requesting device 1100 connected to or in communication with (collectively "connected to") an access device 1200. In an implementation, the connection between the requesting device 1100 and the access device 1200 may be wired, wireless, and/or a combination thereof. The access device 1200 is connected to the telecommunications network 1300, which in turn is connected to a destination device 1400. The telecommunications network 1300 may include, but is not limited to, a telecommunications network core 1310. In an illustrative example, the telecommunications network 1300 and/or portions thereof may be part of a service provider system or network. The connections between the requesting device 1100, the access device 1200, and/or the telecommunications network 1300 may be wired, wireless, and/or a combination thereof. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The requesting device 1100 may be, but is not limited to, end user devices, user equipment (UE), user termination devices, user terminals, personal computers (PCs), cellular telephones, Internet Protocol (IP) devices, computers, desktop computers, laptops, mobile devices, handheld computers, PDAs, personal media devices, smartphones, notebooks, notepads, phablets, and the like. For example, in an implementation, the requesting device 1100 may include applications such as, but not limited to, a mail application, a web browser application, an IP telephony application, and the like.

The access device 1200 may be, but is not limited to, a router, modem, cable modem, set top box, Internet Service Provider (ISP) system device, access point device, network devices, gateway, and the like which provides access to the network 1300.

The telecommunications network 1300 may be or may include, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a Voice over Internet Protocol (VoIP) network, and like including any combinations thereof. In an implementation, the network 1300 may contain one or more servers, network elements, or devices, and the like.

The telecommunications network core 1310 may include, but is not limited to, a NF repository function (NRF) 1500, network function (NF) type 1 1600, 1610, and 1620, NF type 2 1700, 1710, and 1720, NF type 3 1800, 1810, and 1820, and a communications or message bus 1900 for communicating between the elements in the telecommunications network core 1310.

The number of NF type 1 1600, 1610, and 1620, NF type 2 1700, 1710, and 1720, NF type 3 1800, 1810, and 1820 is illustrative. The NF type 1 1600, 1610, and 1620, NF type 2 1700, 1710, and 1720, NF type 3 1800, 1810, and 1820 can be, but is not limited to, Authentication Server Function (AUSF), Core Access and Mobility Management Function (AMF), Data network (DN), Structured Data Storage network function (SDSF), Unstructured Data Storage network function (UDSF), Network Exposure Function (NEF), Policy Control function (PCF), Session Management Function (SMF), Unified Data Management (UDM), and/or User plane Function (UPF), Application Function (AF). Each NF type can request (i.e., a NF consumer) or provide (i.e., a NF producer) services to another NF type. The telecommunications network core 1310 may be, for example, a 5GC. The NFs and NFR 1500 can be, for example, 5G NFs.

Each NF, such as the NF type 1 1600, 1610, and 1620, NF type 2 1700, 1710, and 1720, and NF type 3 1800, 1810, and 1820 can include a cache, a status API, a refresh or periodic timer, and a response timer. In some implementations, each NF can include an isolation timer. For example, the NF type 1 1600 can include a cache 1601, a status API 1603, a refresh or periodic timer 1605, a response timer 1607, and if applicable, an isolation timer 1609. Each of the refresh or periodic timer and the isolation timer can be predefined, configurable, and/or combinations thereof.

The cache 1601 can store, but is not limited to, a list of registered NFs from the NRF 1500, a network address for each of the listed NFs, resource metrics for each of the listed NFs, and a round-trip time (RTT) for each of the listed NFs. The resource metrics can include, but is not limited to, load, priority, CPU utilization, memory utilization, and/or other resource utilization and performance metrics. The list of registered NFs can be maintained by NF type, RTT, one of the resource metrics, and/or a rating or ranking based on a combination of the resource metrics and the RTT. In some implementations, the combination can be a weighted combination based on which resource metric and/or RTT is more important relative to each other. Table 1 is an illustrative example of information stored in the cache 1601.

TABLE 1

| NF | RTT | CPU % | MEMORY % | RANKING |
|---|---|---|---|---|
| NF TYPE 1 #1 | 7 | 60% | 65% | 1 |
| NF TYPE 1 #2 | 9 | 90% | 95% | 2 |

The status API 1603 at a NF (NF producer) can be invoked, using the network address, by another NF to obtain updated resource metrics. The invocation of the status API 1603 can be based on the refresh or periodic timer 1606, on-demand, real-time, and/or combinations thereof. The NF or status API 1603 can determine a RTT by starting the response timer 1607 at time of invocation. The NF or status API 1603 can stop the response timer 1607 when a response is received. The RTT will be the difference between the time a response is received and the start time. In some implementations, in the event of a negative response indicating that the NF is not available or no response is received (collectively "non-responsive NF"), the NF or status API 1603 can isolate the non-responsive NF by starting the isolation timer 1609.

The NRF 1500 can be a centralized repository for the NFs in or instantiated in the telecommunications network core 1310. Each NF registers with the NRF 1500. The NRF 1500 can include a discovery API 1502, which can provide a list of other NFs registered with the NRF 1500. Upon registration with the NRF 1500 by a NF, the NRF 1500 and/or the discovery API 1502 can provide the NF with load factor, priority, and other metrics regarding each registered NF. The NRF 1500 and/or the discovery API can further provide a network address for each registered NF. For example, uniform resource locators (URLs) can be provided for each registered NF.

The destination device 1400 may be, but is not limited to, end user devices, user equipment (UE), user termination devices, user terminals, personal computers (PCs), cellular telephones, Internet Protocol (IP) devices, computers, desktop computers, laptops, mobile devices, handheld computers, PDAs, personal media devices, smartphones, notebooks, notepads, phablets, and the like.

Operationally, an instantiated or new NF in the telecommunications network core 1310 registers with the NRF 1500. The NRF 1500 provides a list of registered NFs, network addresses for each registered NF, and resource metrics. This information is stored in the cache, such as the cache 1601. A NF wanting services (NF consumer) can invoke the network address for each NF that can provide the services (NF producer) on an on-demand or via a periodic timer, such as the periodic timer 1605. The NF consumer or the status API can start the response timer, such as the response timer 1607, when invoking a NF producer or requesting information from the NF producer. When the NF consumer receives a response with the updated resource metrics, the response timer is stopped. A RTT is calculated and stored in the cache. The updated resource metrics and the RTT are used to establish a rank for each NF producer. In some implementations, the rank can be based on one or more of the resource metrics and the RTT. In some implementations, the rank can be based on the RTT. In some implementations, the rank can be based on resource metric, RTT, and/or combination thereof that is relevant to application needing services. The NF producer with the lowest appropriate rating can be selected to provide services to the NF consumer.

In the event a NF producer is a non-responsive NT producer, the non-responsive NT producer can be marked as disabled or isolated, and an isolation timer can be started. Upon expiration of the isolation timer, the NF consumer can invoke or send a request to the non-responsive NT producer.

Figure 2:
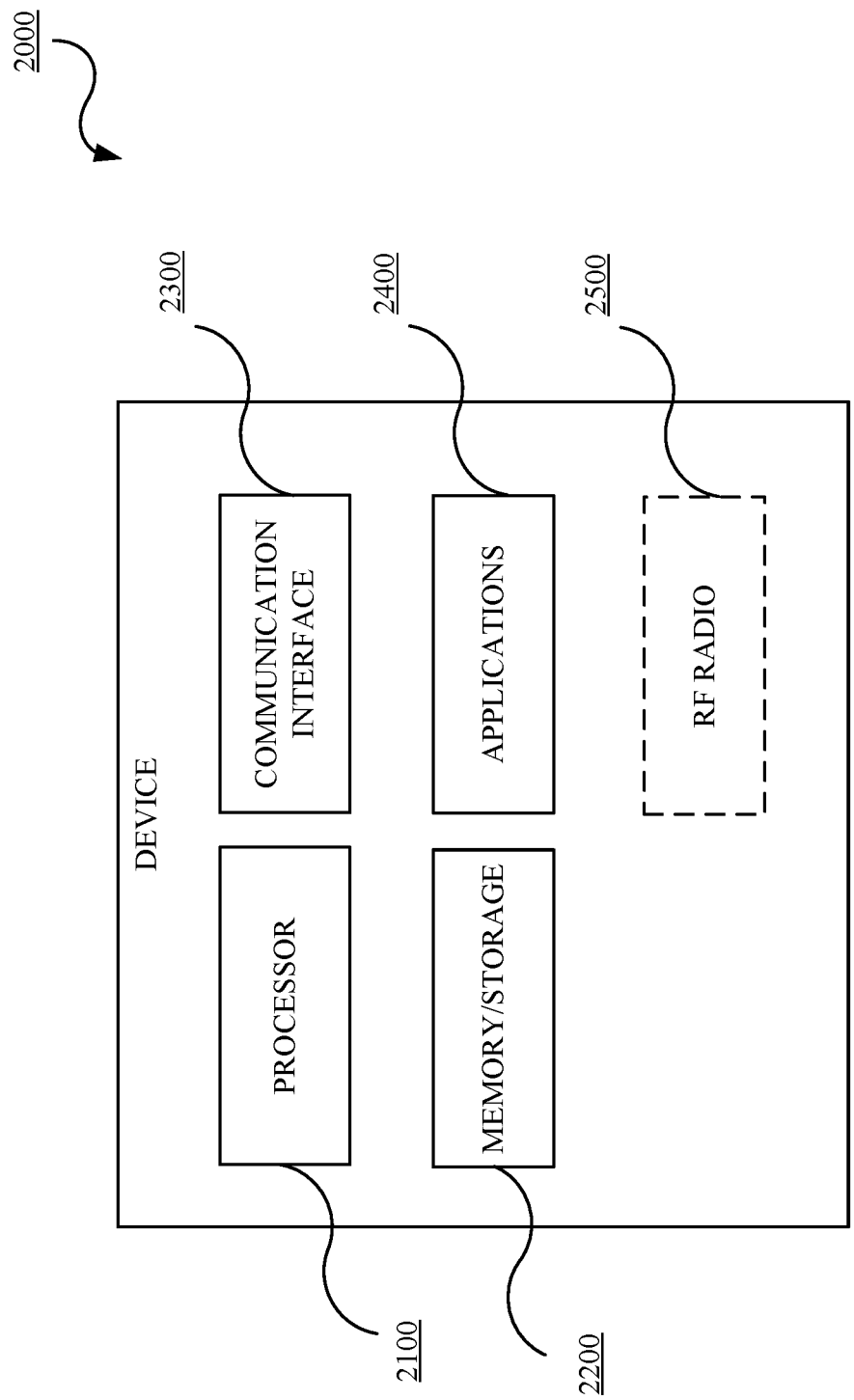
FIG. 2 is a block diagram of an example of a device in accordance with embodiments of this disclosure.

FIG. 2 is a block diagram of an example of a device 2000 in accordance with embodiments of this disclosure. The device 2000 can include, but is not limited to, a processor 2100, a memory/storage 2200, a communication interface 2300, and applications 2400. In some implementations, the device 2000 can include a radio frequency (RF) radio 2500. The device 2000 may include or implement, for example, the requesting device 1100, the access device 1200, the telecommunication network 1300 and the elements and/or components therein, and/or the destination device 1400, for example. In an implementation, the memory/storage 2200 can be the cache and store the resource metrics and the RTT. The techniques or methods described herein may be stored in the memory/storage 2200 and executed by the processor 2100 in cooperation with the memory/storage 2200, the communications interface 2300, the applications 2400, and the RF radio 2500, as appropriate. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
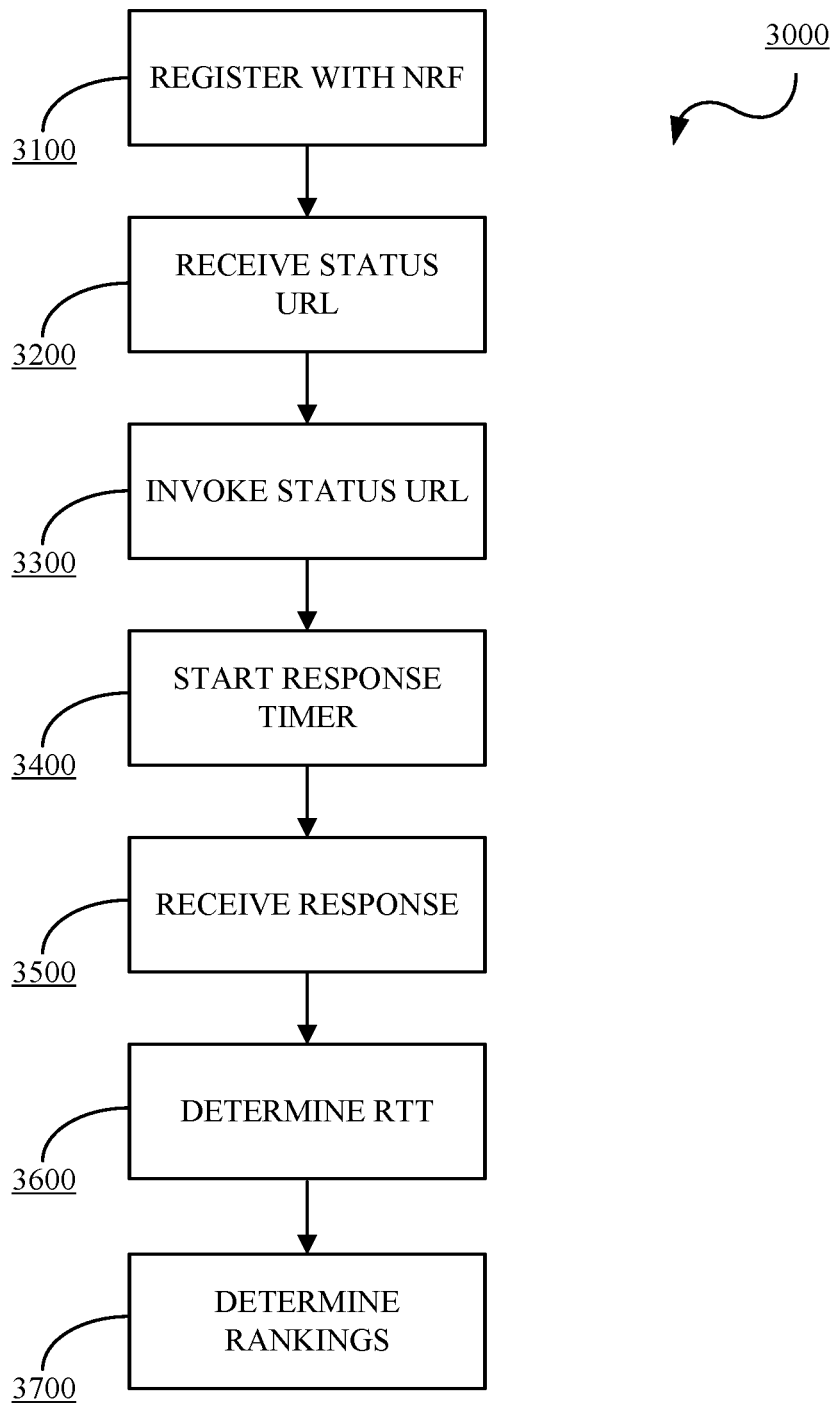
FIG. 3 is a flowchart of an example method for reducing latency in a control place in accordance with embodiments of this disclosure.

FIG. 3 is a flowchart of an example method 3000 for reducing latency in accordance with embodiments of this disclosure. The method 3000 includes: registering 3100 a NF with a NRF; receiving 3200 resource metric information and network addresses for each registered NF; invoking 3300 the network address to obtain updated resource information; starting 3400 a response timer; receiving 3500 a response; determining 3600 a RTT; and determining 3700 rankings. For example, the technique 3000 can be implemented, as applicable and appropriate, by the requesting device 1100, the access device 1200, the telecommunication network 1300 and the elements and/or components therein, the destination device 1400, the processor 2100, the memory/storage 2200, the communication interface 2300, the applications 2400, and/or the RF radio 2500, as appropriate and/or applicable.

The method 3000 includes registering 3100 a NF with an NRF and receiving 3200 resource metric information and network addresses for each registered NF. Each new NF registers with the NRF. The NRF, in response, provides a list of NFs registered with the NRF and includes resource metric information and a network address for each registered NF.

The method 3000 includes invoking 3300 the network address to obtain updated resource information and starting 3400 response timer. Each NF can use the network address to request updated resource metric information from other NFs. In some implementations, sending a request can be based on a periodic timer, a refresh timer, on-demand, in real-time, and/or combinations thereof. A response timer is started to enable calculation of the RTT.

The method 3000 includes receiving 3500 a response and determining 3600 an RTT. A response received from an invoked NF stops the response timer. The RTT is determined from the starting time and the end time. In the event a response is not received, an isolation timer can be started for the non-responsive NF and marked in the list as non-responsive or inactive.

The method 3000 includes determining 3700 rankings. Rankings can be determined from the RTT, one or more of the resource metrics, and/or combinations thereof. Different weights can be assigned to the RTT and/or one or more of the resource metrics. The NF can use the highest rated NF to provide the required services.

Figure 4:
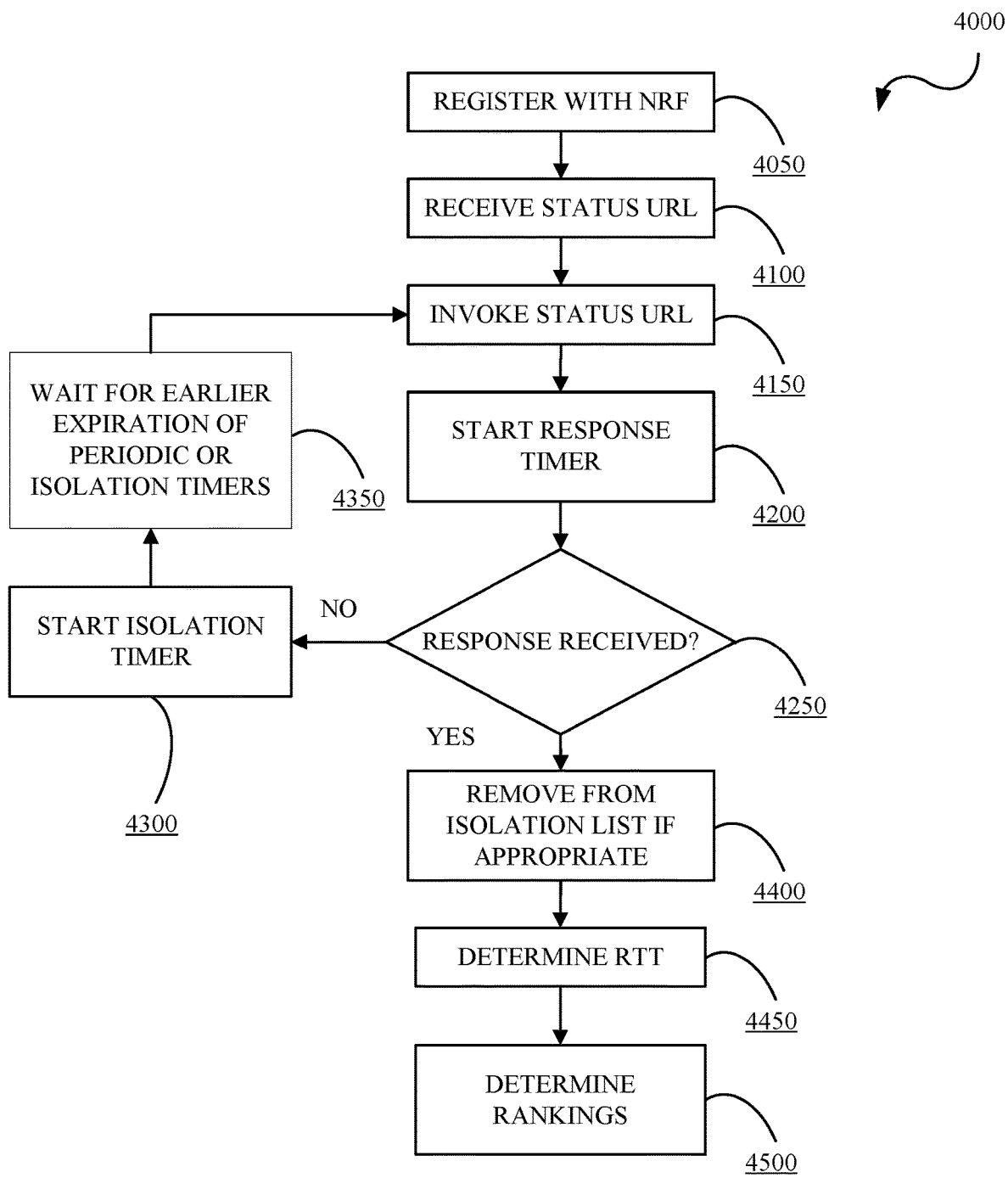
FIG. 4 is a flowchart of another example method for reducing latency in a control place in accordance with embodiments of this disclosure.

FIG. 4 is a flowchart of an example method 4000 for reducing latency in accordance with embodiments of this disclosure. The method 4000 includes: registering 4050 a NF with a NRF; receiving 4100 resource metric information and network addresses for each registered NF; invoking 4150 the network address to obtain updated resource information; starting 4200 a response timer; determining 4250 whether a response has been received; starting 4300 an isolation timer for a non-responsive NF; waiting 4350 for earlier expiration of the isolation timer or periodic timer to check the non-responsive NF; removing 4400 the non-responsive NF if a response is received; determining 4450 a RTT; and determining 4500 rankings. For example, the technique 4000 can be implemented, as applicable and appropriate, by the requesting device 1100, the access device 1200, the telecommunication network 1300 and the elements and/or components therein, the destination device 1400, the processor 2100, the memory/storage 2200, the communication interface 2300, the applications 2400, and/or the RF radio 2500, as appropriate and/or applicable.

The method 4000 includes registering 4050 a NF with an NRF and receiving 4100 resource metric information and network addresses for each registered NF. Each new NF registers with the NRF. The NRF, in response, provides a list of NFs registered with the NRF and includes resource metric information and a network address for each registered NF.

The method 4000 includes invoking 4150 the network address to obtain updated resource information and starting 4200 response timer. Each NF can use the network address to request updated resource metric information from other NFs. In some implementations, sending a request can be based on a periodic timer, a refresh timer, on-demand, in real-time, and/or combinations thereof. A response timer is started to enable calculation of the RTT.

The method 4000 includes determining 4250 whether a response has been received, starting 4300 an isolation timer for a non-responsive NF, and waiting 4350 for earlier expiration of the isolation timer or periodic timer to check the non-responsive NF. In the event a response is not received, an isolation timer can be started for the non-responsive NF and marked in the list as non-responsive or inactive. The NF can check the non-responsive NF at a later time based on expiration of the isolation timer or the periodic timer, which ever timer is earlier.

The method 4000 includes removing 4400 the non-responsive NF from an inactive list if a response is received and determining 4450 a RTT. In general, a response received from an invoked NF stops the response timer. If the response was for an inactive NF, then the NF is made active. In both cases, the RTT is determined from the starting time and the end time.

The method 4000 includes determining 4500 rankings. Rankings can be determined from the RTT, one or more of the resource metrics, and/or combinations thereof. Different weights can be assigned to the RTT and/or one or more of the resource metrics. The NF can use the highest rated NF to provide the required services.

Figure 5:
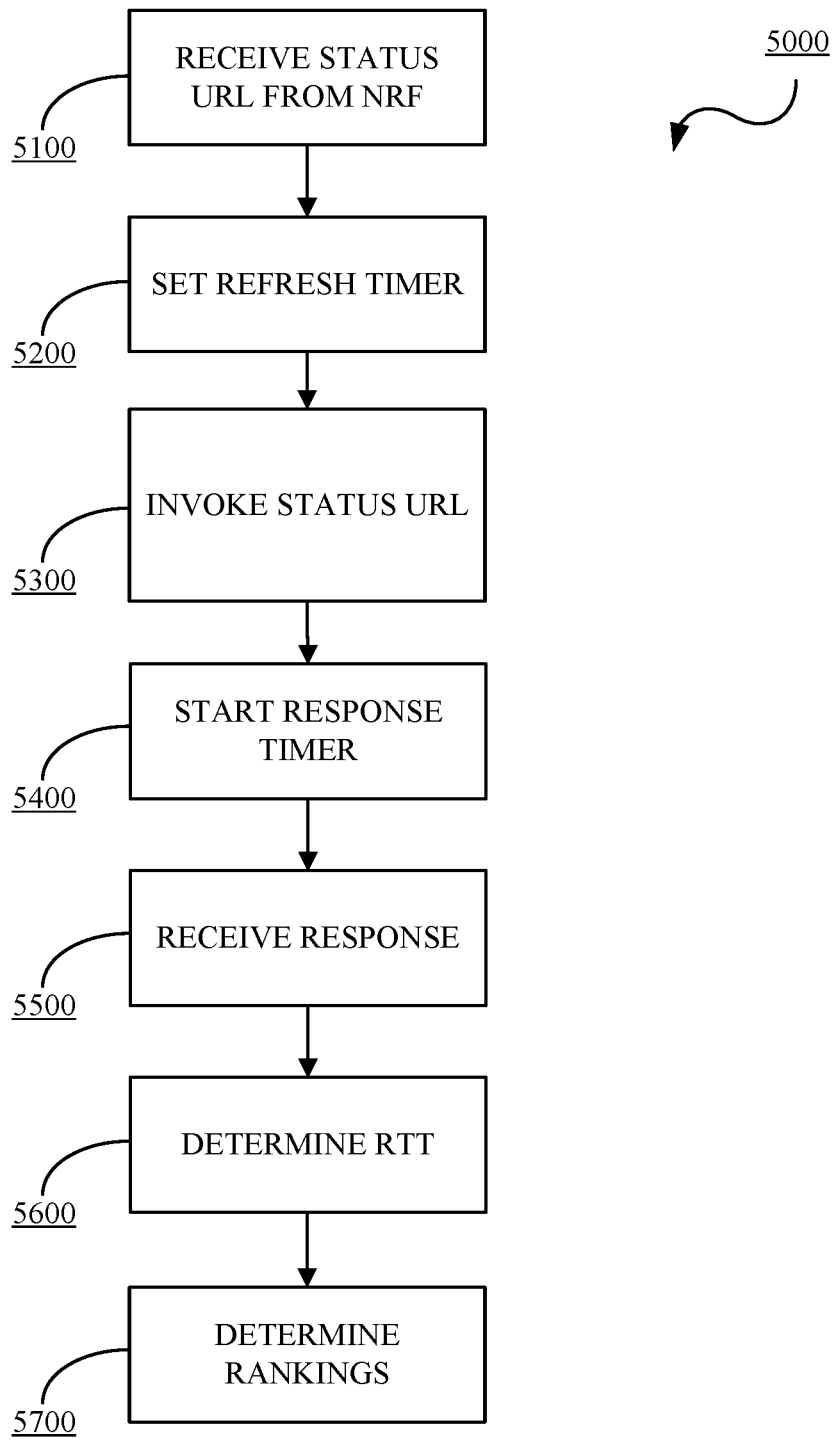
FIG. 5 is a flowchart of another example method for reducing latency in a control place in accordance with embodiments of this disclosure.

FIG. 5 is a flowchart of an example method 5000 for reducing latency in accordance with embodiments of this disclosure. The method 5000 includes: receiving 5100 resource metric information and network addresses for each registered NF; setting 5200 a refresh timer; invoking 5300 the network address to obtain updated resource information; starting 5400 response timer; receiving 5500 a response; determining 5600 a RTT; and determining 5700 rankings. For example, the technique 5000 can be implemented, as applicable and appropriate, by the requesting device 1100, the access device 1200, the telecommunication network 1300 and the elements and/or components therein, the destination device 1400, the processor 2100, the memory/storage 2200, the communication interface 2300, the applications 2400, and/or the RF radio 2500, as appropriate and/or applicable.

The method 5000 includes receiving 5100 resource metric information and network addresses for each registered NF. Each new NF registers with the NRF. The NRF, in response, provides a list of NFs registered with the NRF and includes resource metric information and a network address for each registered NF.

The method 5000 includes setting 5200 a refresh timer. A NF can use a refresh timer to periodically update the resource metric information provided by the NRF but this time directly from the NF using the network address.

The method 5000 includes invoking 5300 the network address to obtain updated resource information and starting 5400 a response timer. Each NF can use the network address to request updated resource metric information from other NFs. In some implementations, sending a request can be based on expiration of the refresh timer, on-demand, in real-time, and/or combinations thereof. A response timer is started to enable calculation of the RTT.

The method 5000 includes receiving 5500 a response and determining 5600 an RTT. A response received from an invoked NF stops the response timer. The RTT is determined from the starting time and the end time. In the event a response is not received, an isolation timer can be started for the non-responsive NF and marked in the list as non-responsive, unavailable, or inactive.

The method 5000 includes determining 5700 rankings. Rankings can be determined from the RTT, one or more of the resource metrics, and/or combinations thereof. Different weights can be assigned to the RTT and/or one or more of the resource metrics. The NF can use the highest rated NF to provide the required services.

Figure 6:
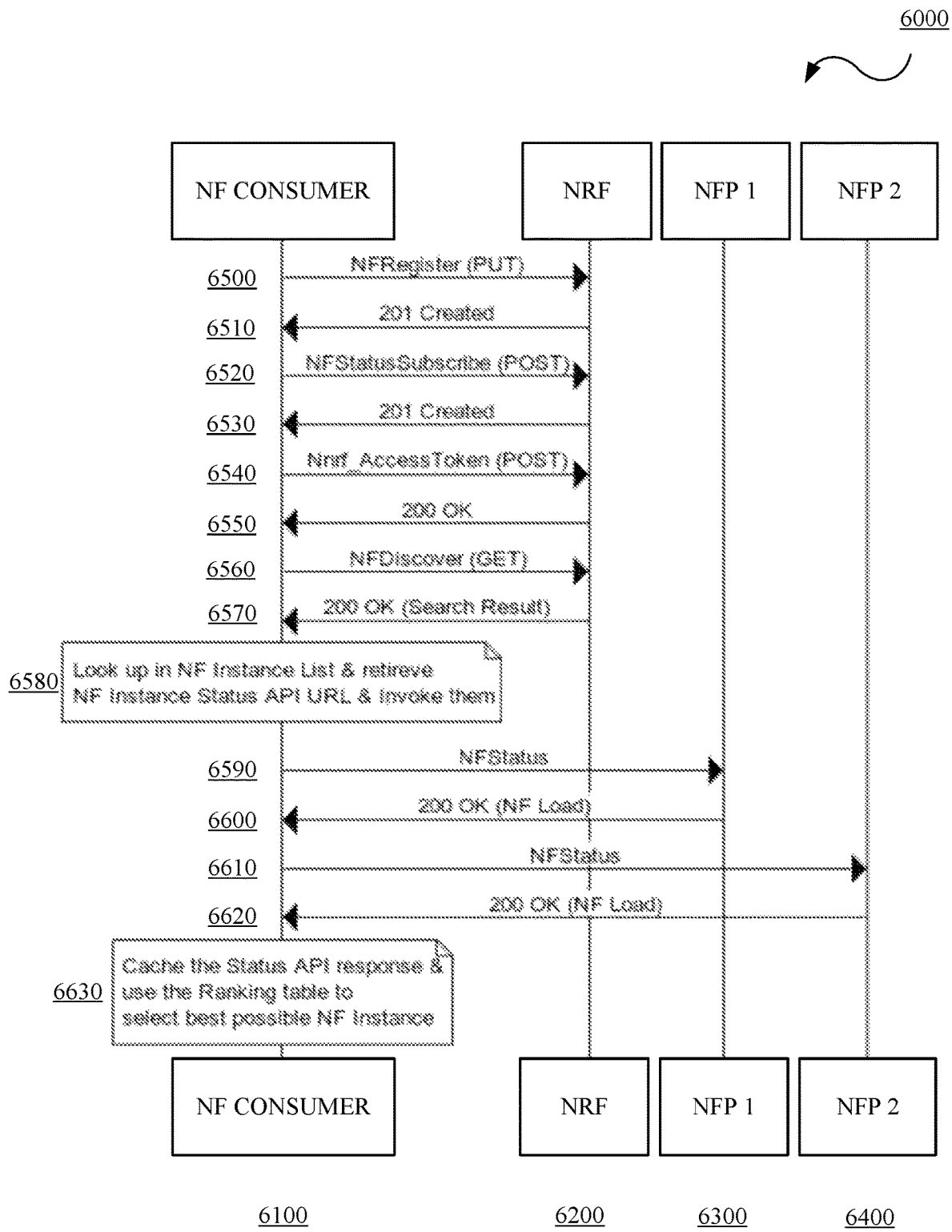
FIG. 6 is a swim diagram of an example telecommunications network architecture and method in accordance with embodiments of this disclosure.

FIG. 6 is a swim diagram of an example telecommunications network architecture 6000 in accordance with embodiments of this disclosure. The telecommunications network architecture 6000 can include a NF consumer 6100, a NRF 6200, a NF producer 1 6300, and a NF producer 2 6400. In this instance, the NF producer 1 6300, and the NF producer 2 6400 are o the same type. In this instance, the NF consumer 6100 is considered to be new to the telecommunications network architecture 6000. The telecommunications network architecture 6000 can include other elements that are not described herein for purposes of clarity.

In accordance with the methods and techniques described herein, the NF consumer 6100 registers with the NRF 6200 (6500) and receives a created message (6510). The NF consumer 6100 subscribes to receive status information (6520) and receives a created message (6530). The NF consumer 6100 performs authentication processing (6540) and receives an OK message (6550). The NF consumer 6100 executes a discover (6560) and receives an OK message with results (6570). The NF consumer 6100 can look up, for example URLs, associated with NF producers for which updated resource metric information is needed and for which RTTs need to be calculated (6580). The NF consumer 6100 can request updated status and/or resource metric information from the NF producer 1 6300 (6590) and receive the updated status and/or resource metric information from the NF producer 1 6300 (6600). The NF consumer 6100 can request updated status and/or resource metric information from the NF producer 2 6400 (6610) and receive the updated status and/or resource metric information from the NF producer 2 6400 (6620). The NF consumer 6100 can calculate RTTs, calculate rankings, and update the cache so as to be able to select the best NF producer (6630).

The described methods and systems for reducing latency can include, but is not limited to, a method for reducing latency in a telecommunications network. In some implementations, the method includes receiving, by a network function (NF) at registration time with a network function repository function (NRF), resource metrics and a network address for each NF registered with the NRF, invoking, by the NF, one or more network addresses to request updated resource metrics from an associated NF, starting, by the NF, a response timer for each invoked network address, stopping, by the NF, the response timer for each invoked network address upon receipt of an updated resource metrics from the associated NF, determining, by the NF, a round-trip time for each associated NF having a start time and a stop time, and determining, by the NF, a ranking for each NF based on at least one of the round-trip time and the updated resource metrics.

In some implementations, the method further includes registering, by each NF with the NRF, upon instantiation in a telecommunications network core of the telecommunications network. In some implementations, the invoking is performed upon expiration of a periodic timer. In some implementations, the invoking is performed on-demand. In some implementations, the method further includes starting, by the NF, an isolation timer for a non-responsive NF. In some implementations, the method further includes marking, by the NF, the non-responsive NF as unavailable. In some implementations, the method further includes checking, by the NF, a status of the non-responsive NF upon earlier expiration of the isolation timer or a periodic timer. In some implementations, the method further includes checking, by the NF, a status of the non-responsive NF upon expiration of the isolation timer. In some implementations, the resource metrics includes at least one of load, priority, central processing units utilization, or memory utilization. In some implementations, the ranking is based on a weighted combination of the round-trip time and one or more of the resource metrics.

The described methods and systems for reducing latency can include, but is not limited to, a telecommunications network including one or more network functions (NFs), each NF configured to provide services to other NFs, and a network function repository function (NRF) configured with a list of each NF of the one or more NFs operating in the telecommunications network. The NRF configured to provide a uniform resource locator and resource metrics of listed NFs to each NF at a time of registration with the NRF. Each NF in the list is further configured to request updated resource metrics from one or more NFs in the list, initiate a response timer for each request, calculate a round-trip time based on receipt of a response from a NF, and determine a rating for each NF for which a response is received, the rating based on at least one of the round-trip time and the updated resource metrics.

In some implementations, the request is performed upon expiration of a refresh timer. In some implementations, the request is performed in real-time when services are needed. In some implementations, each NF in the list is further configured to initiate an isolation timer for a non-responsive NF. In some implementations, each NF in the list is further configured to indicate the non-responsive NF as unavailable in the list. In some implementations, each NF in the list is further configured to send another request to the non-responsive NF upon earlier expiration of the isolation timer or a refresh timer. In some implementations, each NF in the list is further configured to mark the non-responsive as available upon receipt of a response for the another request. In some implementations, the rating is based on a weighted combination of the round-trip time and one or more of the resource metrics.

The described methods and systems for reducing latency can include, but is not limited to, a method for reducing latency in a telecommunications network. In some implementations, the method includes registering by a network function (NF) with a network function repository function (NRF), receiving, by the NF from the NRF, resource metrics and a uniform resource locator (URL) for each NF registered with the NRF, requesting, by the NF, updated resource metrics from one or more registered NFs using an associated URL, determining, by the NF, a round-trip time for each registered NF for which a response was received with the updated resource metrics, and ranking, by the NF, each registered NF using at least one of the round-trip time and the updated resource metrics.

In some implementations, the method further includes isolating, by the NF, a non-responsive NF.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for reducing latency in a telecommunications network, the method comprising:
   receiving, by a network function (NF) at registration time with a network function repository function (NRF), resource metrics and a network address for each NF registered with the NRF;
   invoking, by the NF, one or more network addresses to request updated resource metrics from an associated NF;
   starting, by the NF, a response timer for each invoked network address;
   stopping, by the NF, the response timer for each invoked network address upon receipt of an updated resource metrics from the associated NF;
   checking, by the NF, a status of a non-responsive NF upon earlier expiration of an isolation timer or a periodic timer;
   determining, by the NF, a round-trip time for each associated NF having a start time and a stop time; and
   determining, by the NF, a ranking for each NF based on the round-trip time and the updated resource metrics.

2. The method of claim 1, the method further comprising:
   registering, by each NF with the NRF, upon instantiation in a telecommunications network core of the telecommunications network.

3. The method of claim 1, wherein the invoking is performed upon expiration of a periodic timer.

4. The method of claim 1, wherein the invoking is performed on-demand.

5. The method of claim 1, the method further comprising:
   starting, by the NF, the isolation timer for the non-responsive NF.

6. The method of claim 5, the method further comprising:
   marking, by the NF, the non-responsive NF as unavailable.

7. The method of claim 6, the method further comprising:
   checking, by the NF, a status of the non-responsive NF upon expiration of the isolation timer.

8. The method of claim 1, wherein the resource metrics includes at least one of load, priority, central processing units utilization, or memory utilization.

9. The method of claim 1, wherein the ranking is based on a weighted combination of the round-trip time and one or more of the resource metrics.

10. A telecommunications network comprising:
    one or more network functions (NFs), each NF configured to provide services to other NFs; and
    a network function repository function (NRF) configured with a list of each NF of the one or more NFs operating in the telecommunications network, the NRF configured to provide a uniform resource locator and resource metrics of listed NFs to each NF at a time of registration with the NRF,
    wherein each NF in the list is further configured to:
       request updated resource metrics from one or more NFs in the list;
       initiate a response timer for each request;
       send another request to a non-responsive NF upon earlier expiration of an isolation timer or a refresh timer;
       calculate a round-trip time based on receipt of a response from a NF; and
       determine a rating for each NF for which a response is received, the rating based on the round-trip time and the updated resource metrics.

11. The telecommunications network of claim 10, wherein the request is performed upon expiration of a refresh timer.

12. The telecommunications network of claim 10, wherein the request is performed in real-time when services are needed.

13. The telecommunications network of claim 10, wherein each NF in the list is further configured to:
    initiate the isolation timer for the non-responsive NF.

14. The telecommunications network of claim 13, wherein each NF in the list is further configured to:
    indicate the non-responsive NF as unavailable in the list.

15. The telecommunications network of claim 10, wherein each NF in the list is further configured to:
    mark the non-responsive NF as available upon receipt of a response for the another request.

16. The telecommunications network of claim 10, wherein the rating is based on a weighted combination of the round-trip time and one or more of the resource metrics.

17. A method for reducing latency in a telecommunications network, the method comprising:
    registering by a network function (NF) with a network function repository function (NRF);
    receiving, by the NF from the NRF, resource metrics and a uniform resource locator (URL) for each NF registered with the NRF;
    requesting, by the NF, updated resource metrics from one or more registered NFs using an associated URL;
    checking, by the NF, a status of a non-responsive NF upon earlier expiration of an isolation timer or a periodic timer;
    determining, by the NF using a response timer, a round-trip time for each registered NF for which a response was received with the updated resource metrics; and
    ranking, by the NF, each registered NF using the round-trip time and the updated resource metrics.

18. The method of claim 17, the method further comprising:
    isolating, by the NF using the isolation timer, the non-responsive NF.

* * * * *